Aug. 28, 1934.   J. W. BRUNDAGE   1,971,849
MOLDING APPARATUS
Filed July 14, 1932

Inventor
J. W. Brundage.
By Robert M. Pierson,
Attorney

Patented Aug. 28, 1934

1,971,849

UNITED STATES PATENT OFFICE 1,971,849

MOLDING APPARATUS

James William Brundage, Akron, Ohio, assignor to The Summit Mold & Machine Company, Akron, Ohio, a corporation of Ohio Application July 14, 1932, Serial No. 622,401

12 Claims. (Cl. 18—17)

This invention relates to molding apparatus, particularly that which is intended for forming, or molding and vulcanizing, hollow articles of rubber or other plastic material, such as bathing caps and the like. In this connection, my object is to provide for associating one or more mandrels or formers with the mold in such a manner that the articles will be properly molded and the mandrel or mandrels movable to a convenient stripping position.

The invention also relates to molding or vulcanizing presses, and has for a further object to associate mold sections or platens with each other and with the press members in an improved manner for molding rubber and other articles including those of hollow form.

A still further object is to provide an improved combination between such a molding apparatus and such a press, and especially a press having heads mounted for relative reciprocating and tilting movements, to the end that hollow articles of rubber or other plastic material may be more rapidly and economically produced.

Of the accompanying drawing, Fig. 1 is a side elevation, partly broken away and in section, showing a hydraulic press and molding apparatus embodying my invention in a preferred form.

Figure 1:
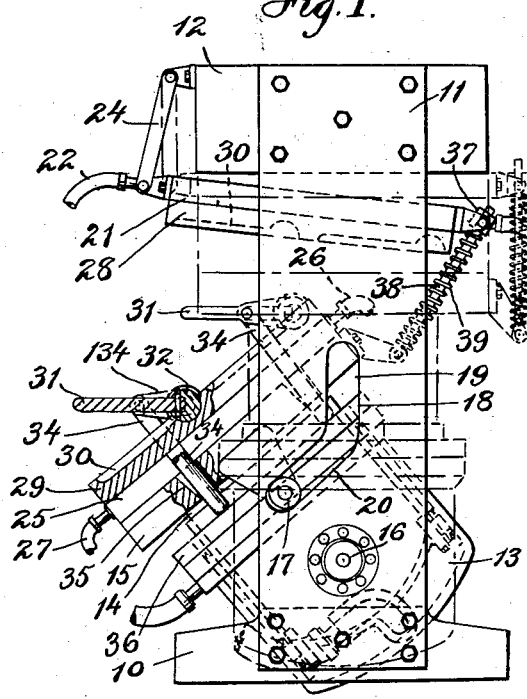
Figure 2:
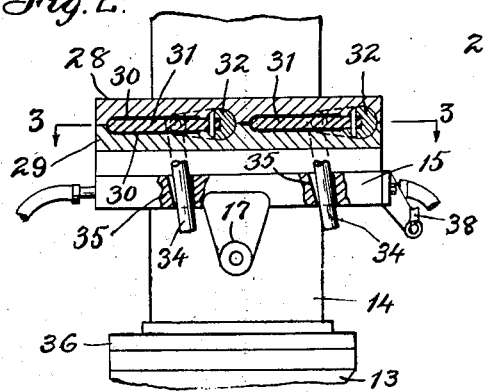
Fig. 2 is a side elevation, partly broken away and in vertical section, showing portions of the press and the molding apparatus in closed position, the upper part of the section being on the line 2—2 of Fig. 3.
Figure 3:
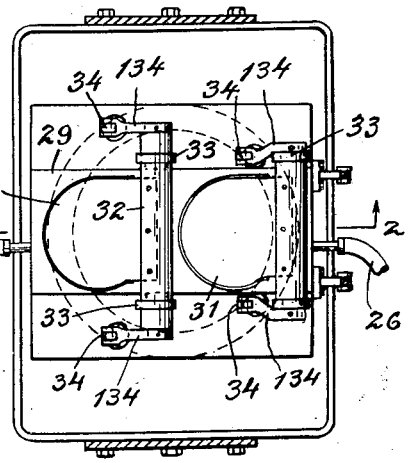
Fig. 3 is a plan view and horizontal section on the line 3—3 of Fig. 2.

Referring at first to Figs. 1, 2 and 3, I have illustrated my invention in connection with a press of the general type disclosed in my prior application Ser. No. 497,637, filed Nov. 24, 1930, but it will be understood that the press features might be considerably varied.

10 is a base to which are attached the lower ends of sideframe plates 11 having attached to their upper ends a fixed press head 12. 13 is a hydraulic ram cylinder in which reciprocates a plunger 14 fixedly carrying at its upper end the lower or movable press head 15. The ram cylinder is pivoted for swinging movement between the frame-plates 11 by trunnions 16. The lower head 15, on side lugs projecting outwardly and downwardly therefrom, carries a pair of pins having rollers 17 thereon movable in cam slots 18 formed in the side frames 11, each of said slots having a vertical rectilinear upper portion 19 and a lower portion 20 inclined at an angle to said upper portion. By movement of the ram plunger 14 in its cylinder, the lower head 15 is reciprocated in parallelism with the upper fixed head 12 to effect the final closing and initial opening relative movements of the heads, while the rollers 17 are in the upper rectilinear portions of the cam slots 19, and during the lower part of the plunger movement, while the rollers are in the inclined lower portions of the slots, the lower head 15 undergoes a combined reciprocating and tilting movement to carry it to and from the loading and unloading position. The lower parts are shown in the full-open position in full lines in Fig. 1, the ram and lower head being then tilted forwardly out of line with the upper head for convenient access to the lower mold section, and said parts are shown by broken lines in the closed position.

21 is an upper heating platen provided with suitable steam-supply and discharge pipes 22, 23 and connected by a pair of links 24 pivoted at their lower ends to brackets on the forward end of the platen and at their upper ends to brackets on the upper press head 12 so that said platen may have a combined tilting and lateral movement in respect to the upper head. 25 is a lower heating platen fixed to the movable press head 15 and having steam-supply and discharge pipes 26, 27.

To the platens 21 and 25 are secured respective mating upper and lower mold sections 28, 29, having cavities constituted by pockets or half cavities 30 in the respective sections, of suitable shape for molding the desired article, in this instance a bathing cap. The number of cavities will depend upon the relative size of the article and the mold, and in this case I have represented cavities for simultaneously molding two bath caps.

With the lower mold section 29 and its press head 15 are associated mandrels or formers 31, in number corresponding to the number of cavities and adapted to occupy said cavities when the mold is closed, for shaping the interiors of the bathing caps or other articles. These mandrels are shown as pivotally associated with the lower mold section on different centers, each being attached along its rear edge to a rock-shaft 32 mounted in a transverse groove in the mold section 29 and adapted to occupy a corresponding groove in the upper mold section 28 when the sections are together as represented in Fig. 2, so that the mandrels may be said to be pivoted between the mold sections. The rock-shafts 32 may be held in place by bearings 33 attached to the lower mold section 29.

For separately operating the respective mandrels 31, I provide the ends of each of the rock-shafts 32 with arms 134 to whose outer ends are pivotally connected the upper ends of a pair of rods 34 guided in upwardly-flaring apertures 35 in the rim of the lower press head 15, the lower ends of said rods abutting against the head 36 of the ram cylinder 13.

On brackets at the rear end of the upper platen 21 are pivotally mounted a pair of guide blocks 37 slidingly engaged with link rods 38 whose lower ends are pivoted to brackets on the rear edge of the lower press head 15. Helical springs 39 surround the rods between their lower bracket connections and the guide blocks 37, thus forming with said rods and blocks a resilient sliding-link connection between the lower press head and the upper platen with its mold section. Thereby the tilting and lateral movement is imparted to the platen 21 by the tilting and reciprocating movement of the lower press head 15, and the lower mold section 29 is permitted to move into proper registration with the upper mold section during the closing movement of said sections, while the sections are yieldingly separated during the opposite movement.

In the operation of this embodiment, when the mold sections 28, 29 are closed together, the mandrels 31 occupy the molding cavities and are then positioned in the same plane. On retraction of the lower platen 15 by means of the ram plunger to open the press, the lower mold section 29 moves away from the upper section 28, and during the concluding portion of the retracting movement, the lower ends of the rods 34 encounter the cylinder head 36, thereby arresting the rods so that further retracting movement of head 15 to the full-open position will swing the mandrels 31 on their centers to approximately horizontal stripping positions in planes one above the other as represented in Fig. 1. The molded and vulcanized articles may thereby conveniently be stripped from the mandrels, whereupon fresh unvulcanized articles are placed on the mandrels and the cycle of the press is repeated.

Figure 4:
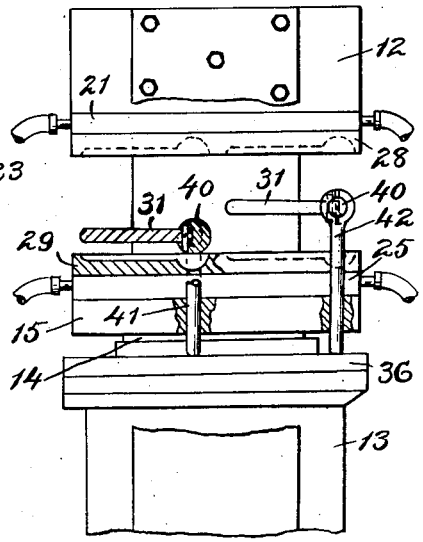
Fig. 4 is a partial view corresponding to Fig. 1, showing a modification.

In the modification illustrated in Fig. 4 is shown an ordinary hydraulic press wherein both the upper press head 12 and the ram cylinder 13 are fixed in position on the press frame and the lower platen 15 carried by the ram plunger 14 moves in parallelism with the upper head in a fixed rectilinear path from the closed to the full-open position. The steam platens 21 and 25 and the mold sections 28 and 29 are carried by the respective press heads, and in this case I have shown a pair of bathing cap mandrels 31 attached to cross bars 40 which are carried by pairs of rods 41, 42 guided for straight rectilinear movements in sets of apertures in the rim of the lower platen, whereby the respective mandrels will be bodily moved relatively to the lower mold section, separately into and out of the molding cavities in the latter by coaction of the lower ends of their supporting rods with the cylinder head 36. The supporting rods 41 of the forward mandrel 31 are shorter than the rods 42 of the rear mandrel so that in the stripping positions of the mandrels represented in Fig. 4 the rear mandrel will occupy a horizontal plane above that of the forward mandrel to expose the mandrels for convenient stripping at different levels.

It will be understood that further modifications of embodiment could be made without departing from the scope of my invention as defined in the claims.

I claim:

1. Molding apparatus comprising complemental, separable mold sections forming a molding cavity, and a mandrel pivoted for swinging movement into and out of said cavity, transversely of the parting plane of said mold sections, and formed to carry with it the article molded thereon.

2. Molding apparatus comprising a mold including separable mold sections forming a cavity for molding the exterior of an article, and a mandrel in said cavity for molding the interior of the article, said mandrel being pivotally associated with one of the mold sections on an axis substantially parallel to the plane of separation between said sections to swing into a stripping plane at an angle to said plane of separation.

3. Molding apparatus comprising a pair of mating mold sections formed with a molding cavity, and a mandrel in said cavity, pivoted between the sections for swinging movement with respect to one of them.

4. A vulcanizing press comprising a sectional mold having a pivoted mandrel, press means for opening and closing said mold, and means controlled by the movement of said press for first opening the mold and then swinging said mandrel from molding to stripping position.

5. A vulcanizing press comprising a pair of heads mounted for relative reciprocating and tilting movements, a mold having a section pivoted at one end to one of said heads and another section carried by the other head, and a link connection between said other head and the other end of said pivoted section.

6. A vulcanizing press comprising upper and lower heads mounted for relative reciprocating and tilting movements, a mold having an upper section linked at one end to the upper head and a lower section carried by the lower head, and a resilient sliding link connection between said lower head and the other end of said upper mold section.

7. A vulcanizing press comprising a ram having a cylinder and plunger, a head carried by said plunger, a mold including a section carried by the head and having a mandrel pivotally associated therewith, and mandrel-swinging rods coacting with the cylinder and guided on said head for relatively moving the mandrel from molding to stripping position when the ram plunger is retracted to open the mold.

8. Molding apparatus comprising a mold section, a plurality of mandrels operatively associated therewith and occupying the same molding plane, and means for separately moving said mandrels respectively into different stripping planes.

9. Molding apparatus comprising a mold section having a plurality of molding cavities, and a plurality of mandrels pivotally associated with said section on different centers, said mandrels occupying the same molding plane in the cavities and swingable out of the cavities respectively into different stripping planes.

10. A vulcanizing press comprising a pair of press heads mounted for relative reciprocating and tilting movements, a fluid-pressure ram and guiding means for imparting said movements, said ram having a plunger carrying one of the heads, mating mold sections carried by the respective heads, one of which has a plurality of mandrels pivotally associated therewith, occupying the same molding plane and different stripping planes, and means actuated by retracting movement of the ram plunger for swinging said mandrels into their stripping positions.

11. A vulcanizing press comprising fixed and movable press heads, a mold having mating sections carried by the respective heads, a plurality of mandrels associated with the movable section, means for reciprocating the movable head in parallelism with the fixed head between full-open and closed positions, and means actuated by retraction of the movable head for bodily moving said mandrels from the same molding plane into different stripping planes with respect to said movable mold section.

12. A vulcanizing press comprising upper and lower press heads mounted for relative reciprocating and tilting movements, a mold section mounted for pivotal and lateral movements on the upper head and linked to the lower head, a mating mold section carried by the lower head and having a plurality of mandrels associated therewith, and means actuated by retraction of the lower head for moving said mandrels from molding positions in the same plane to stripping positions in different planes.

JAMES WILLIAM BRUNDAGE.